United States Patent [19]
Hess

[11] 3,963,457
[45] June 15, 1976

[54] COAL GASIFICATION PROCESS
[75] Inventor: Martin Hess, Pittsburgh, Pa.
[73] Assignee: Koppers Company, Inc., Pittsburgh, Pa.
[22] Filed: Nov. 8, 1974
[21] Appl. No.: 522,257

[52] U.S. Cl. .................................. 48/202; 48/200; 48/206
[51] Int. Cl.² ........................................... C10J 3/16
[58] Field of Search ............ 48/201, 202, 210, 215, 48/197 R, 206, 200

[56]          References Cited
         UNITED STATES PATENTS

| | | | |
|---|---|---|---|
| 2,132,533 | 10/1938 | Koppers | 48/202 X |
| 2,148,299 | 2/1939 | Koppers | 48/202 |
| 2,151,121 | 3/1939 | Koppers | 48/202 |
| 2,302,156 | 11/1942 | Totzek | 48/202 X |
| 2,311,140 | 2/1943 | Totzek | 48/202 X |
| 3,907,519 | 9/1975 | Sieg | 48/210 |

Primary Examiner—R.E. Serwin
Attorney, Agent, or Firm—Sherman H. Barber; Olin E. Williams; Oscar B. Brumback

[57]           ABSTRACT

An improvement in the Koppers-Totzek coal gasification system comprises the step of adding cool and clean recycle gas to the product gas as it leaves the gasifier unit, thereby eliminating the use of water sprays to quench the product gas.

4 Claims, 1 Drawing Figure

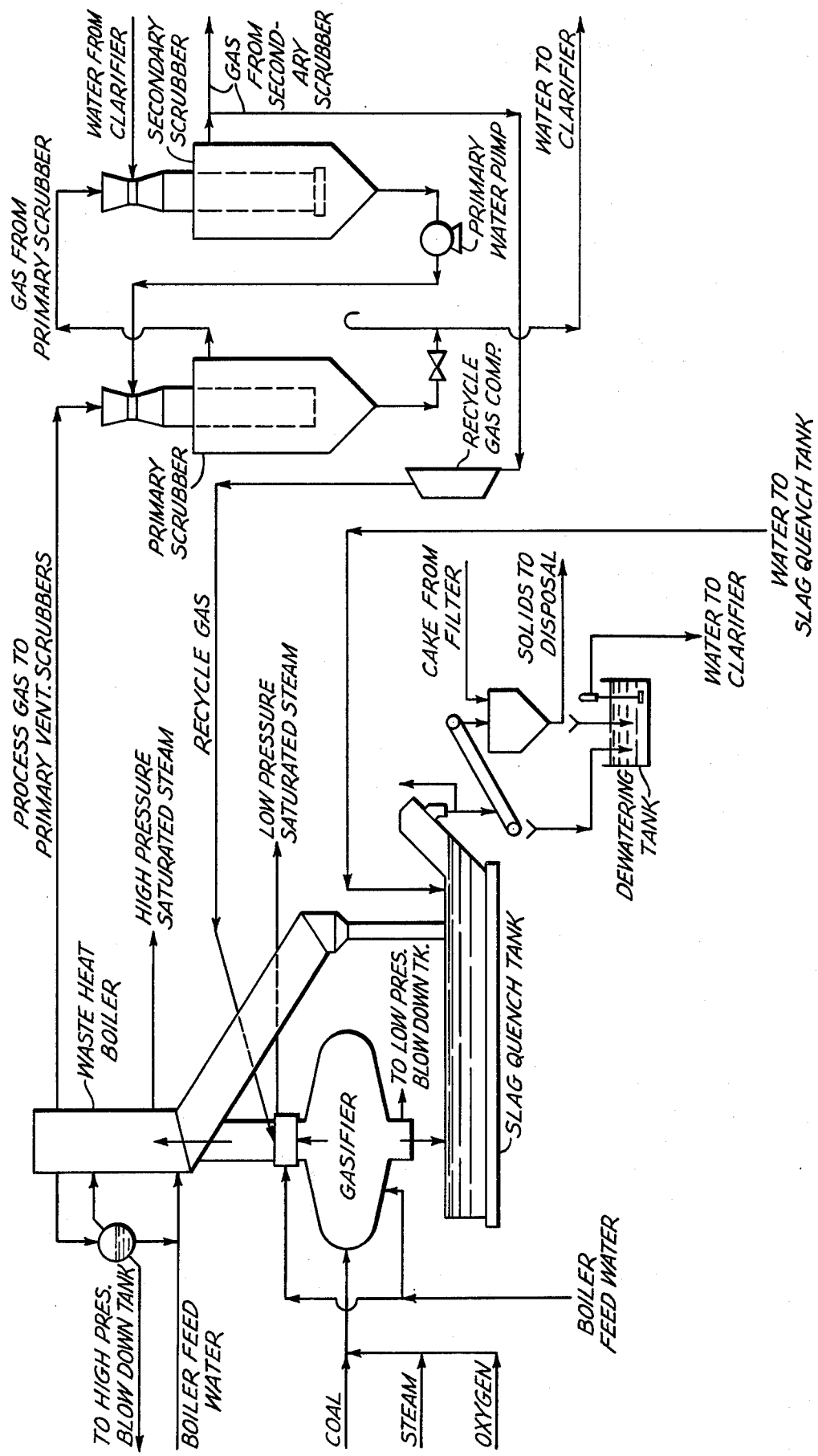

COAL GASIFICATION PROCESS

BACKGROUND OF THE INVENTION

As long ago as 1948, a demonstration plant for the gasification of coal in suspension was built and operated at the U.S. Bureau of Mines facility in Missouri. Subsequently, the first commercial plant that used the Koppers-Totzek coal gasification process was built and operated in Finland, and since then additional commercial coal gasification plants using the Koppers-Totzek process have been built and are operating in various countries of the world. The Koppers-Totzek process is recognized and understood by those skilled in the art to be a process for the gasification of coal in suspension. Hereinafter the Koppers-Totzek process is designated as KTP.

In order to avoid the fouling of heat transfer surfaces of the waste heat boilers used in the KTP, it is necessary to solidify the liquid slag droplets that are entrained in the gas leaving the gasifier, and to cool the liquid slag droplets to a temperature at which they are not tacky. This means that the entire gas stream leaving the gasifier must be cooled to a temperature that is about 100°F (38°C) below the slag softening temperature. For most coals, the softening temperature of the ash is in the range of about 1900°F to 2400°F (1037°C to 1316°C). In the KTP it is customary to operate the gasifier at a temperature of about 2700°F (1482°C) and to use a water spray to quench the hot gas just as it leaves the gasifier, before it enters the waste heat boiler.

In the current method of operating a KTP facility, the water droplets from the sprays are entrained in the high velocity gas leaving the gasifier. It is believed that the surface of each droplet reaches the boiling temperature almost instantaneously; that the droplets then absorb heat from the hot gas; and that they vaporize over a finite time interval as they flow along with the gas stream. The resulting water vapor diffuses into and mixes with the main hot gas stream. At the same time, the ash particles lose heat to the now cooler gas that surrounds them. There is no direct transfer of heat between the liquid water and the ash since both are finely dispersed in the continuous gas phase and since both occupy only a very small portion of the total volume. All heat transfer takes place by way of the continuous gas phase which acts as an intermediary between the water and the ash. In a typical installation of the KTP, the liquid water spray and the ash occupy each only about 0.005 percent of the total volume.

The heat absorbed by the spray water may be broken down into two parts. The first part comprises: (1) the sensible heat of liquid water rising from its inlet temperature of about 115°F (46.1°C) to its boiling temperature at 212°F (100°C); (2) its latent heat of vaporization; and (3) the heat to raise the temperature of the resulting steam from 212°F (100°C) to the final temperature at which the gas leaves the waste heat boiler, which is about 350°F (176.7°C). The large amount of heat used to accomplish all of this is lost; leaving as sensible heat in the liquid streams from the scrubbers and from the gas cooler and being rejected to the atmosphere in the gas-cleaning cooling tower. the waste The second part of the heat absorbed by the spray water heats the resultant steam from 350°F (176.7°C) to about 2060°F (1115.5°C), but this heat is recovered in the waste heat boiler.

BRIEF SUMMARY OF THE INVENTION

In the Koppers-Totzek coal gasification process, cleaned and cooled product gas is recycled into the product gas as it leaves the gasifier unit to cool the product gas, thereby eliminating using water sprays at that location to cool the product gas.

For a further understanding of the invention and for features and advantages thereof, reference may be made to the following description and the drawing which illustrates a flow diagram, that includes an embodiment of the present invention as a part of the KTP.

BRIEF DESCRIPTION OF THE DRAWING

The drawing illustrates a flow diagram of a portion of the KTP showing an embodiment of an improvement therein according to the invention.

DETAILED DESCRIPTION

Referring to the drawing, principal ingredients such as coal, steam and oxygen enter a conventional Koppers-Totzek (KT) gasifier wherein the coal is gasified. The ash, in the form of slag, gravitates into a slag quench tank and thereafter is conveyed to a receiving bin and from this bin the solids are conveyed to a disposal site.

The gases flowing from the gasifier enter a waste heat boiler from which high pressure saturated steam is withdrawn. The KTP gas leaves the waste heat boiler and flows into a primary Venturi-type scrubber. Water discharges from the primary scrubber and flows thence to a clarifier. KTP gas leaves the primary scrubber and flows into a secondary Venturi-type scrubber. KTP gas leaves the secondary srubber and a portion thereof is returned through a recycle gas compressor to the stream of KTP gas just as it leaves the gasifier.

In accordance with conventional practice of operating a KTP facility, spray water from the primary water pump flows into the stream of KTP gas just as it leaves the gasifier; at the same location where the recycle gas from the Venturi scrubber enters in accordance with the present invention.

Heretofore, there has been a large heat loss in the KTP, comprising the first part described herein previously, and to eliminate this large heat loss it is suggested, in accordance with the invention, to eliminate the spray water quenching of the KTP gas, and to introduce instead recycle gas that leaves the secondary Venturi-type scrubber, as shown in the drawing and as mentioned previously.

When the gas leaves the secondary Venturi-type scrubber, it is clean and relatively cool. An alternate source of recycle gas would be the gas leaving the waste heat boiler, or the gas leaving the primary Venturi-type scrubber. Using recycle gas from these alternate sources, especially the waste heat boiler source, would further increase the thermal efficiency of the KTP, but any solid matter in the gas could be troublesome to the operator of a KT plant.

In one example of the operation of a KTP facility the steam output of the waste heat boiler is increased by about 18 percent when recycle gas quenching, in accordance with the present invention, is employed over against using water spray quenching which is a conventional practice.

Example

Material balance around waste heat boiler

| Item | KTP with water sprays | KTP with gas recycling |
|---|---|---|
| | Flow in pounds per hour | |
| Gas out of gasifier | 440,000* | 440,000 |
| Spray cooling water | 68,000 | Nil |
| Recycle gas | Nil | 175,000 |
| Gas to waste heat boilers | 509,000 | 616,000 |
| Gas to scrubbers (35°F or 9.7°C) | 509,000 | 616,000 |
| High pressure steam (1514 psia, 597.6°F or 203.1°C) | 332,000 | 392,000 |
| Increase of high pressure steam generated | | about 18 percent |

*All figures are approximate

The benefit derived from gas recycling over against spray water cooling depends on the ash softening temperature. In general, an increase in high pressure steam output between about 10 percent, when the ash softening temperature is 2400°F (1316°C), and about 25 percent, when the ash softening temperature is 1900°F (1036°C), can be achieved, depending also on the type of coal used.

While the present invention has immediate application to the KTP, it should be understood that such application is used only as an example. The invention is indeed applicable to any entrained gasification process. The invention is a method for attaining increased heat recovery and thermal efficiency from any entrained gasification process in which the product gases leave the gasifier at elevated temperature.

From the foregoing description of one embodiment of the invention, those skilled in the art should recognize many important features and advantages of it, among which the following are particularly significant:

That gas quenching is expected to be more effective than water quenching, since it would require less time to cool the main gas stream by mixing in the recycle gas stream than it would to vaporize the water droplets;

That the gas cooling load is decreased, since there is no quenching water that must be condensed; and That the load on the gas cleaning cooling tower is also decreased when gas quenching is employed.

Although the invention has been described herein with a certain degree of particularity it is understood that the present disclosure has been made only as an example and that the scope of the invention is defined by what is hereinafter claimed.

What is claimed is:

1. A coal gasification process known as the Koppers-Totzek process wherein pulverized coal, oxygen and steam are introduced through opposed burner heads into a gasifier and react therein to produce slag and a product gas that is thereafter scrubbed, wherein the improvement comprises:
   a. recycling scrubbed product gas to mix with and cool said product gas prior to scrubbing.

2. The invention of claim 1 including the step:
   a. removing a portion of cooled and scrubbed product gas from said process as said recycle gas.

3. A coal gasification process known as the Koppers-Totzek process wherein pulverized coal, oxygen and steam react in a gasifier to produce slag and a product gas that is subjected to water spraying, wherein the improvement comprises:
   a. eliminating said water spraying of said product gas; and
   b. cooling said product gas with cleaned and cooled product gas recycled into and mixed with the product gas generated in said gasifier.

4. The invention of claim 3 wherein:
   a. said cleaned and cooled product gas is product gas that has been treated in a gas scrubbing device.

* * * * *